(12) United States Patent
McGill

(10) Patent No.: US 6,712,236 B1
(45) Date of Patent: Mar. 30, 2004

(54) APPARATUS FOR DISPENSING OF FOOD FROM ONE PORTION CONTAINER

(75) Inventor: Shane Robert McGill, Addington (GB)

(73) Assignee: McGill Technology Limited, West Maling (GB)

(*) Notice: Subject to any disclaimer, the term of this patent is extended or adjusted under 35 U.S.C. 154(b) by 37 days.

(21) Appl. No.: 10/111,229
(22) PCT Filed: Oct. 9, 2000
(86) PCT No.: PCT/GB00/03881
§ 371 (c)(1), (2), (4) Date: May 7, 2002
(87) PCT Pub. No.: WO01/30176
PCT Pub. Date: May 3, 2001

(30) Foreign Application Priority Data

Oct. 23, 1999 (GB) .............................. 9925014

(51) Int. Cl.[7] ................................ A24F 27/14
(52) U.S. Cl. .................... 221/150 R; 222/95
(58) Field of Search ............... 221/1, 150 R; 222/92, 95, 105, 181.1; 141/82, 114

(56) References Cited

U.S. PATENT DOCUMENTS

| 2,106,893 A | 2/1938 | Klein |
| 2,670,116 A | 2/1954 | Johansen |
| 2,889,949 A | 6/1959 | Nirenberg |
| 2,925,347 A | 2/1960 | Cummings |
| 2,927,544 A | 3/1960 | Kolander |
| 3,126,841 A | 3/1964 | Nay |
| 3,166,025 A | 1/1965 | Hulse |
| 3,405,532 A | * 10/1968 | Lindsey ..................... 62/66 |
| 4,942,910 A | * 7/1990 | Hamamura ................. 141/9 |
| 5,020,698 A | 6/1991 | Crossley |
| 5,893,485 A | * 4/1999 | McGill ..................... 222/95 |
| 5,918,767 A | * 7/1999 | McGill ..................... 222/95 |

FOREIGN PATENT DOCUMENTS

| DE | 298 12 059 U | 1/1999 |
| EP | 0 369 723 A | 5/1990 |
| GB | 2 009 086 A | 6/1979 |
| WO | 93 00824 A | 1/1993 |
| WO | 97 42096 A | 11/1997 |

OTHER PUBLICATIONS

Patent Abstract of Japan, vol. 1996, No. 07, Jul. 31, 1996, & JP 08 070783 A, Mar. 19, 1996.
Patent Abstract of Japan, vol. 1995, No. 11, Dec. 26, 1995 & JP 07 227214 A, Aug. 29, 1995.

* cited by examiner

Primary Examiner—Kenneth W. Noland
(74) Attorney, Agent, or Firm—Nixon & Vanderhye P.C.

(57) ABSTRACT

The dispensing apparatus of the invention is primarily intended to dispense frozen product from one portion containers (10), usually by extrusion through a circular outlet (13). In order that the product shape (46) after discharge is capable of being ball-shaped the receptacle (40) into which the product is discharged is located to provide resisted discharge of product over at least part of the discharge cycle. By providing resisted discharge the product shape is altered and laterally increased so that a ball-shaped portion of product is received in the receptacle.

24 Claims, 6 Drawing Sheets

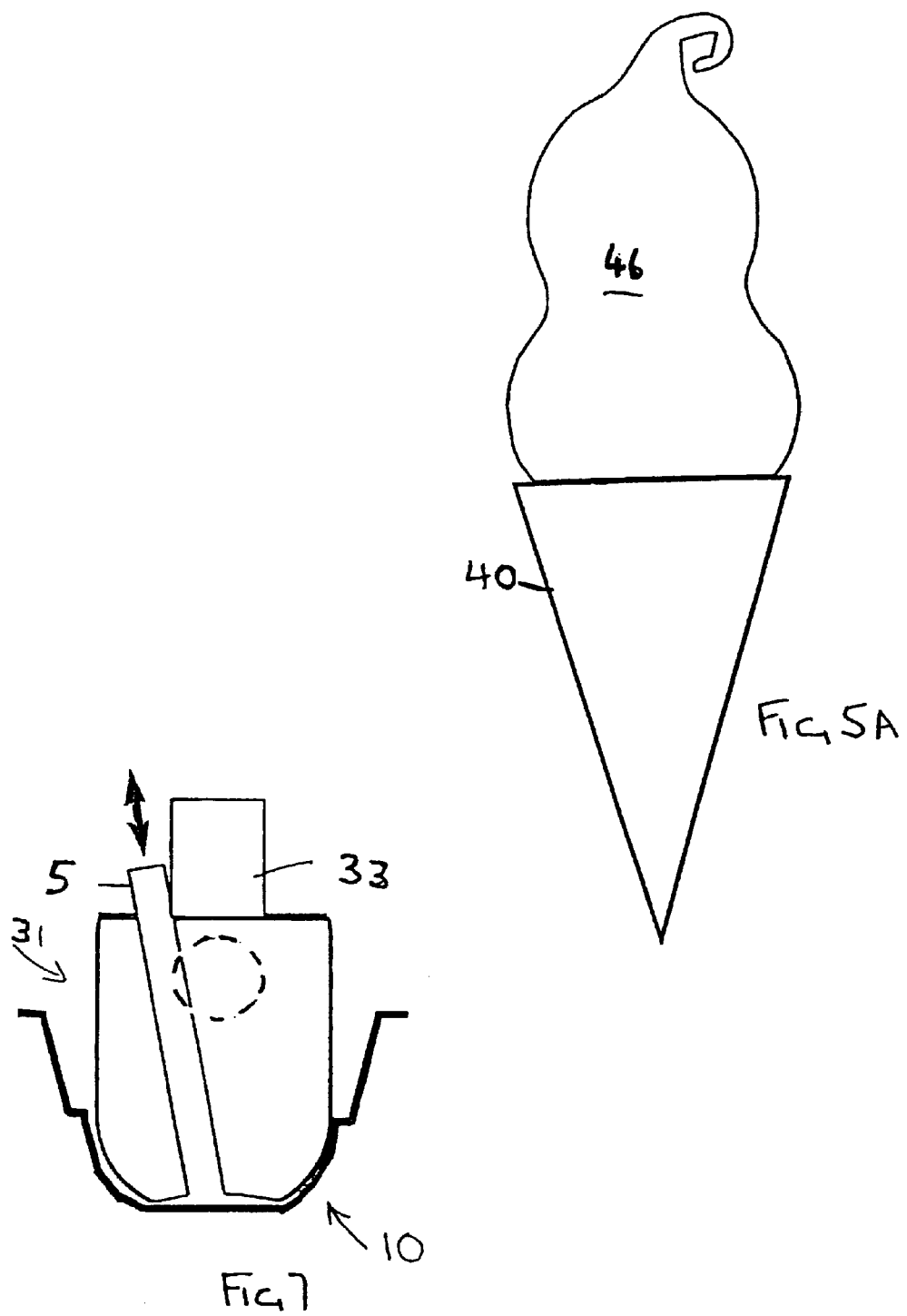

APPARATUS FOR DISPENSING OF FOOD FROM ONE PORTION CONTAINER

Figure 1:
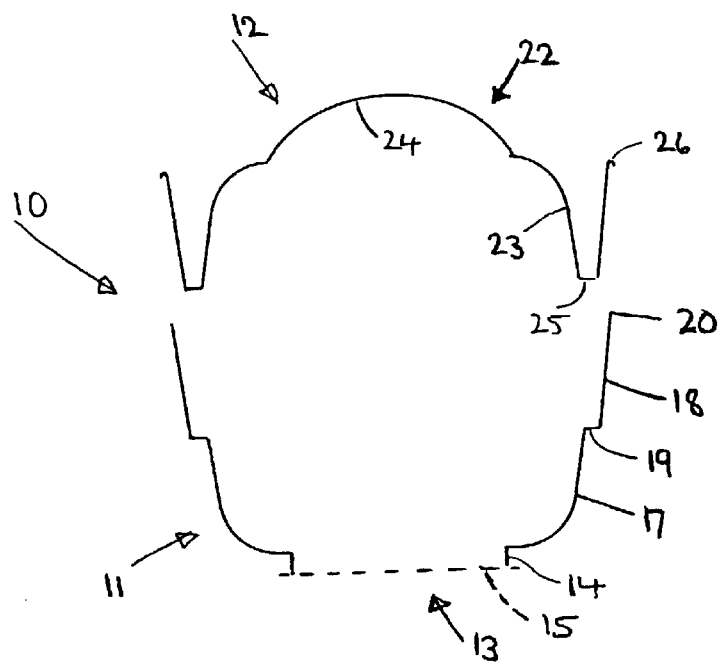

This application is the US national phase of international application PCT/GB00/03881 filed Oct. 9, 2000, which designated the US.

This invention relates to dispensing apparatus, in particular apparatus for dispensing food product from pre-filled containers, for example ice-cream.

It is a popular method of dispensing ice-cream from pre-filled containers to remove serving portions manually employing so-called scoops by which relatively hard, frozen balls of ice-cream are removed and served into edible containers or comets. Often such ice-cream is of premium quality so there is a perception that ice-cream product taking this form is of better quality than so-called "soft-serve" ice-cream dispensed in other ways. However, scoop ice-cream is associated with several problems amongst which are that the serving process is laborious and time consuming and the use of open topped containers is unhygienic and wasteful of product.

It is an object of the present invention to provide a dispensing apparatus and method which overcomes problems with existing systems.

According to the invention there is provided a food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge. The compression force may be variable so that initially during discharge there may be no resistance. Thereafter the force may be increased. In this way the product may initially freely enter the receptacle, for example an edible cone, then the force increases causing the cross section to increase, and finally the remainder of the product leaves the container. If the container is appropriately shaped the final discharge of product may present a generally spherical appearance in the receptacle.

The container may have a deformable portion which is deformed to reduce the container volume and extrude product.

Conveniently the outlet is of generally circular shape so that product normally issues in an initially cylindrical form but the outlet may be of other shapes.

The outlet may be formed as an opening sealable by a removable seal. Alternatively the opening may be formed by pressure of product engaging frangible portions of the base which may, for example, include radially directed weakened lines in the base radiating from a central point, the weakened lines parting under the pressure of product engaging the base. This provides an opening through which the product is extruded.

The internal shape of the deformable portion of the container is preferably of curvilinear, for example part spherical, form to assist in providing a part spherical shape to the product discharged into the receptacle. Alternatively, the container includes a piston and cylinder arrangement, movement of the piston reducing the container volume.

The receptacle is preferably mounted on a support which is moveable relative to the container during discharge, such movement including a movement during discharge to bring about the compression force and/or a movement for removal of the receptacle after discharge of product. The support may be resiliently mounted to permit resisted movement of the receptacle.

According to a further feature of the invention there is provided apparatus for dispensing product comprising a product container having an outlet and a portion which is moved towards the outlet to reduce the container volume, a support for the container, discharge drive means for engaging the moveable portion of the container to move said portion towards the outlet to discharge product by extrusion through the outlet, support means for a receptacle for product discharged, the support means being moveable relative to the container in the direction of discharge and according to the amount of product discharged from the container to bring about a compression force on the product discharged. In this way resistance to the product discharged from the container causes the cross-section of product to be increased.

Preferably the support includes support drive means for effecting said movement relative to the container, such drive means being timed to operate according to the operation of the discharge drive means.

The discharge drive means preferably includes a linear drive driving a plunger engaging a deformable portion or piston of the container and the linear drive is capable of moving the plunger at a constant rate or variable rate according to the position of the plunger during discharge.

Figure 2:
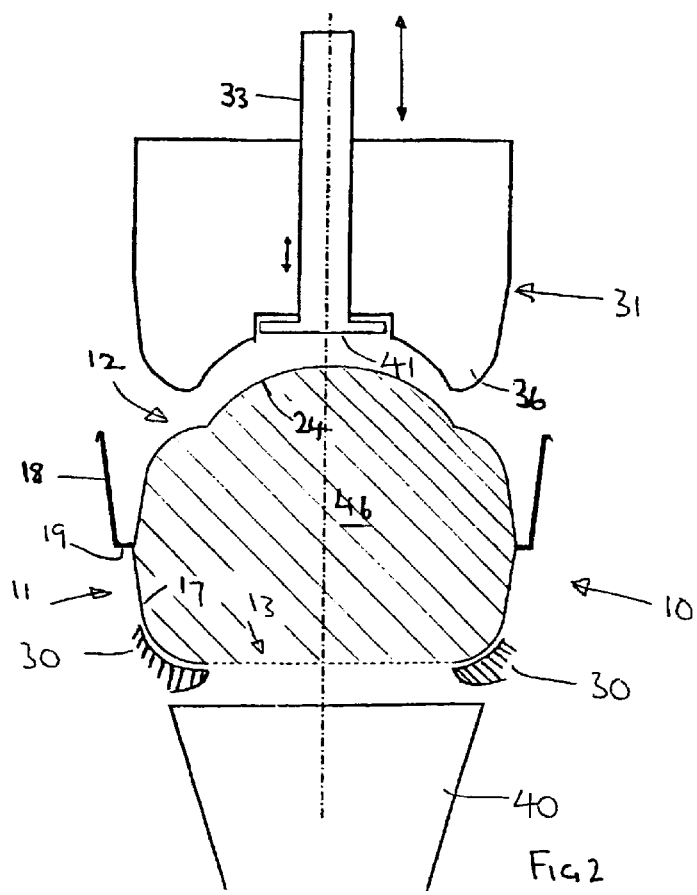
Figure 3:
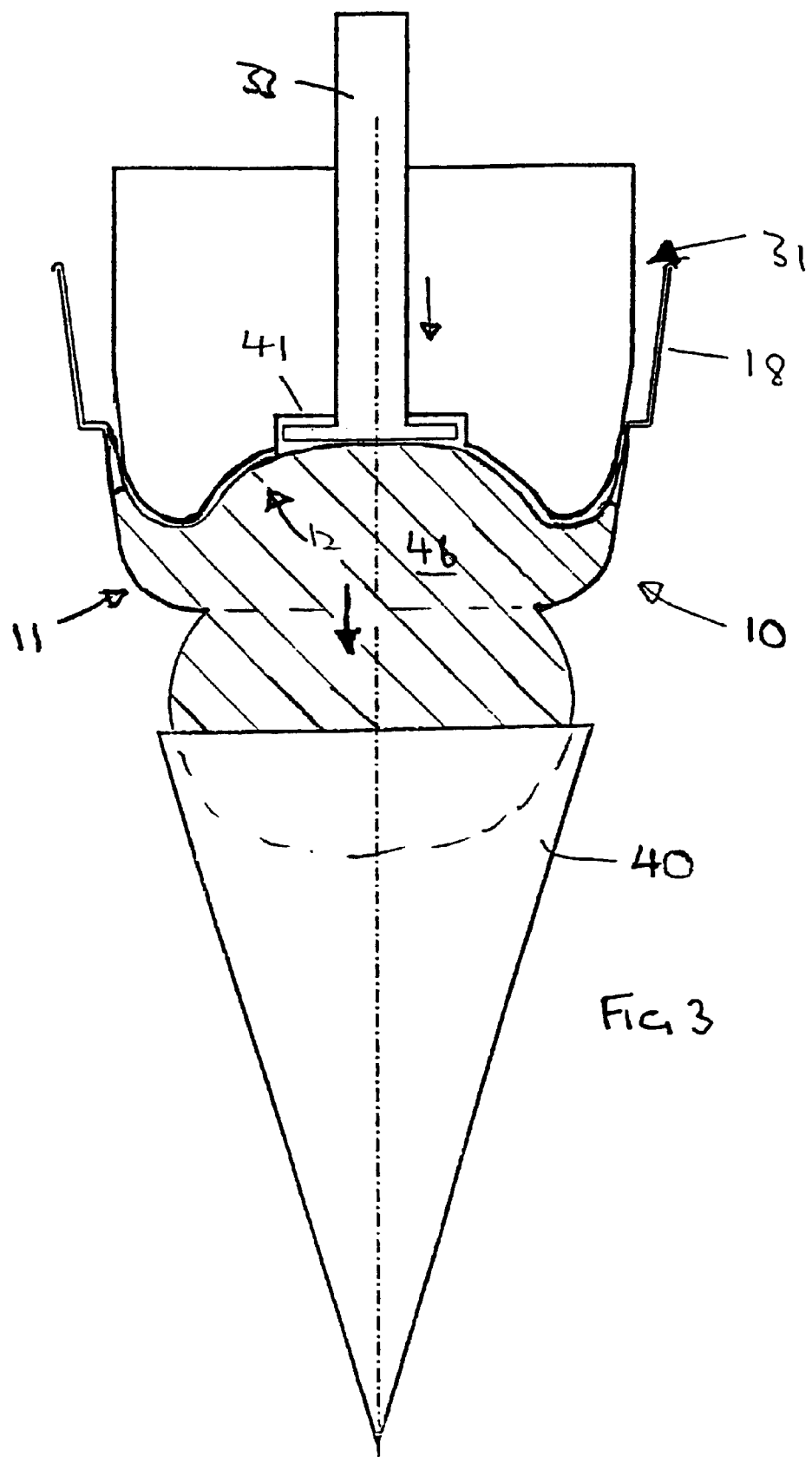
Figure 4:
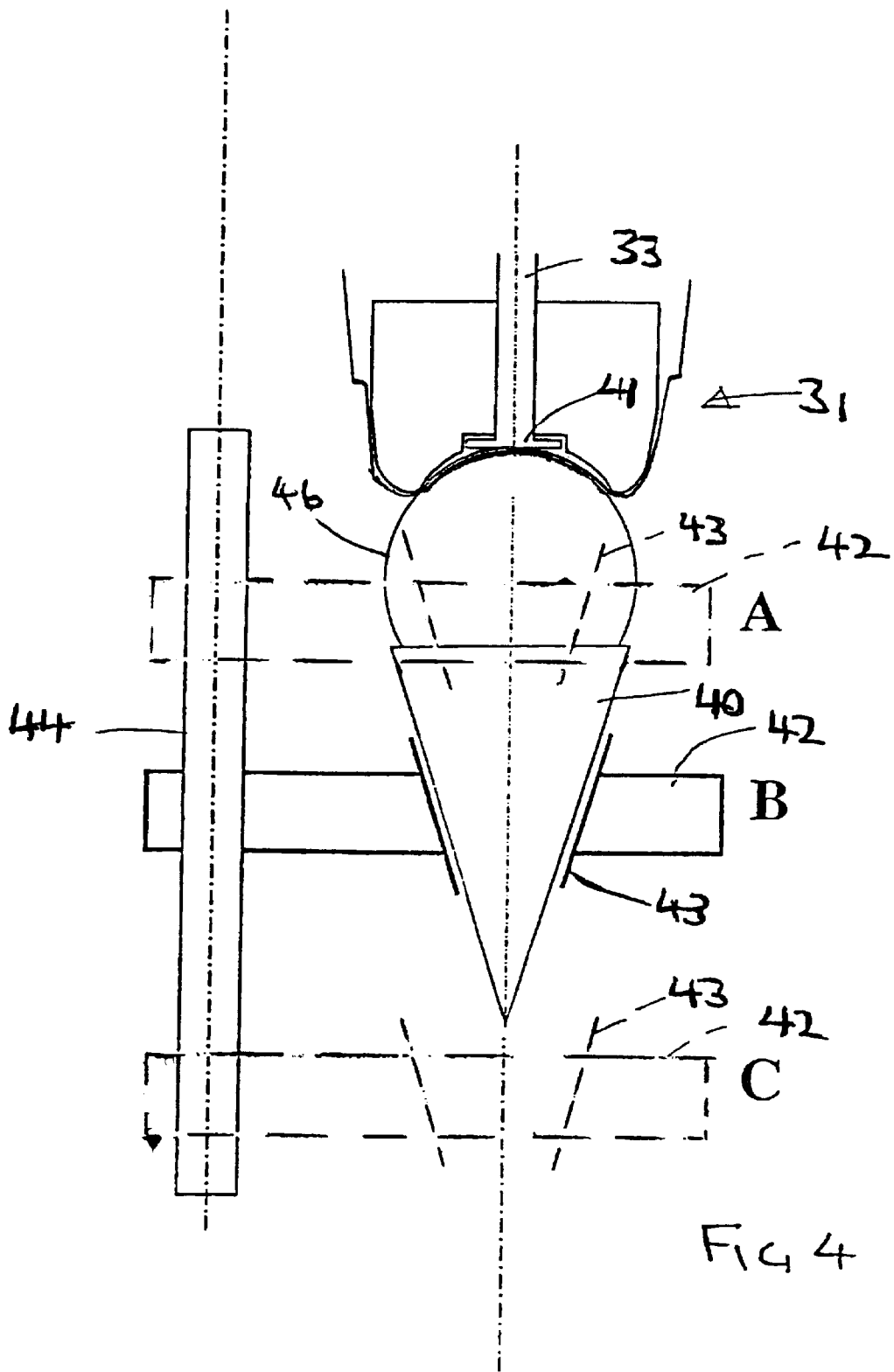
Figure 5:
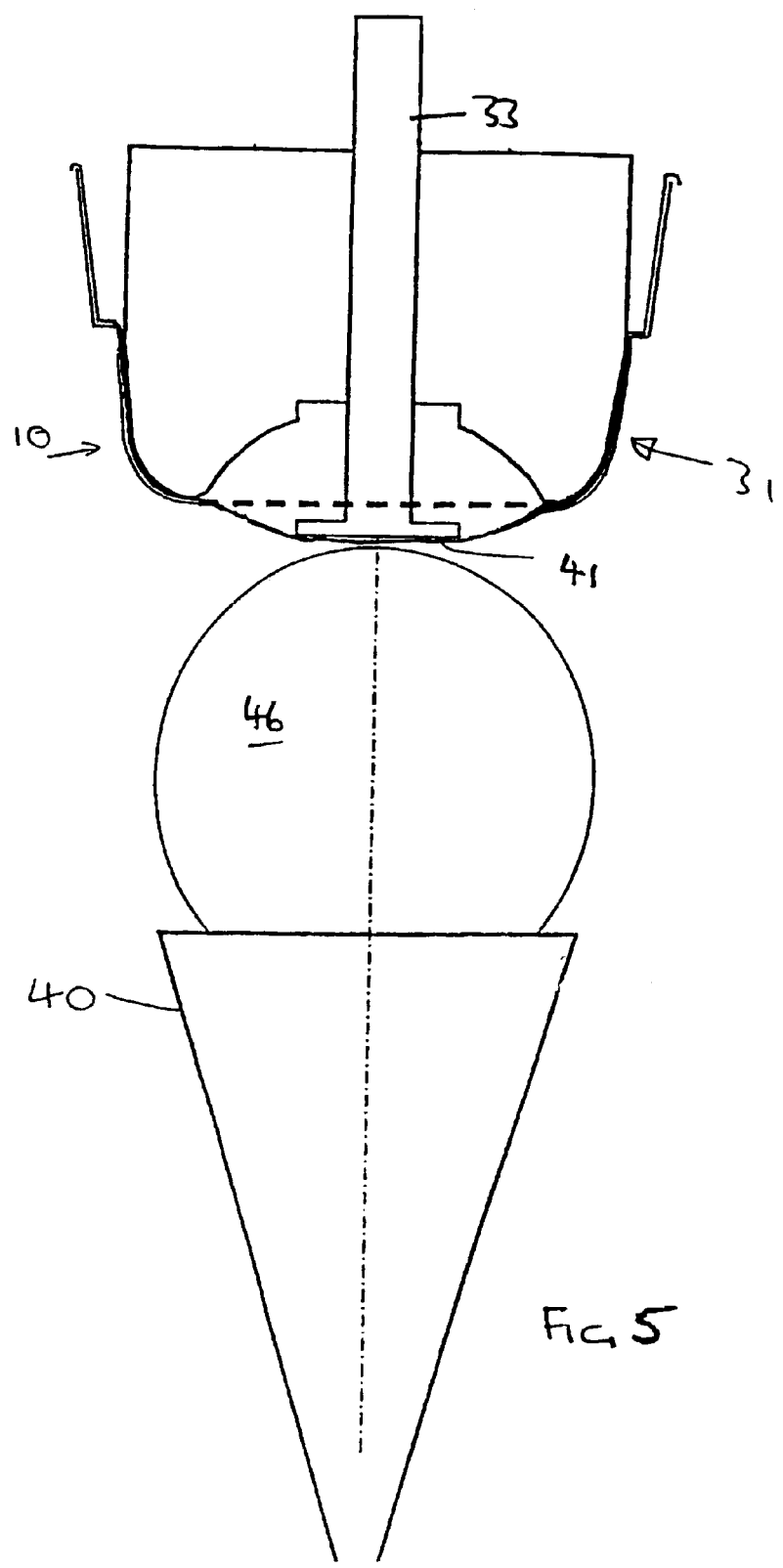
Figure 6:
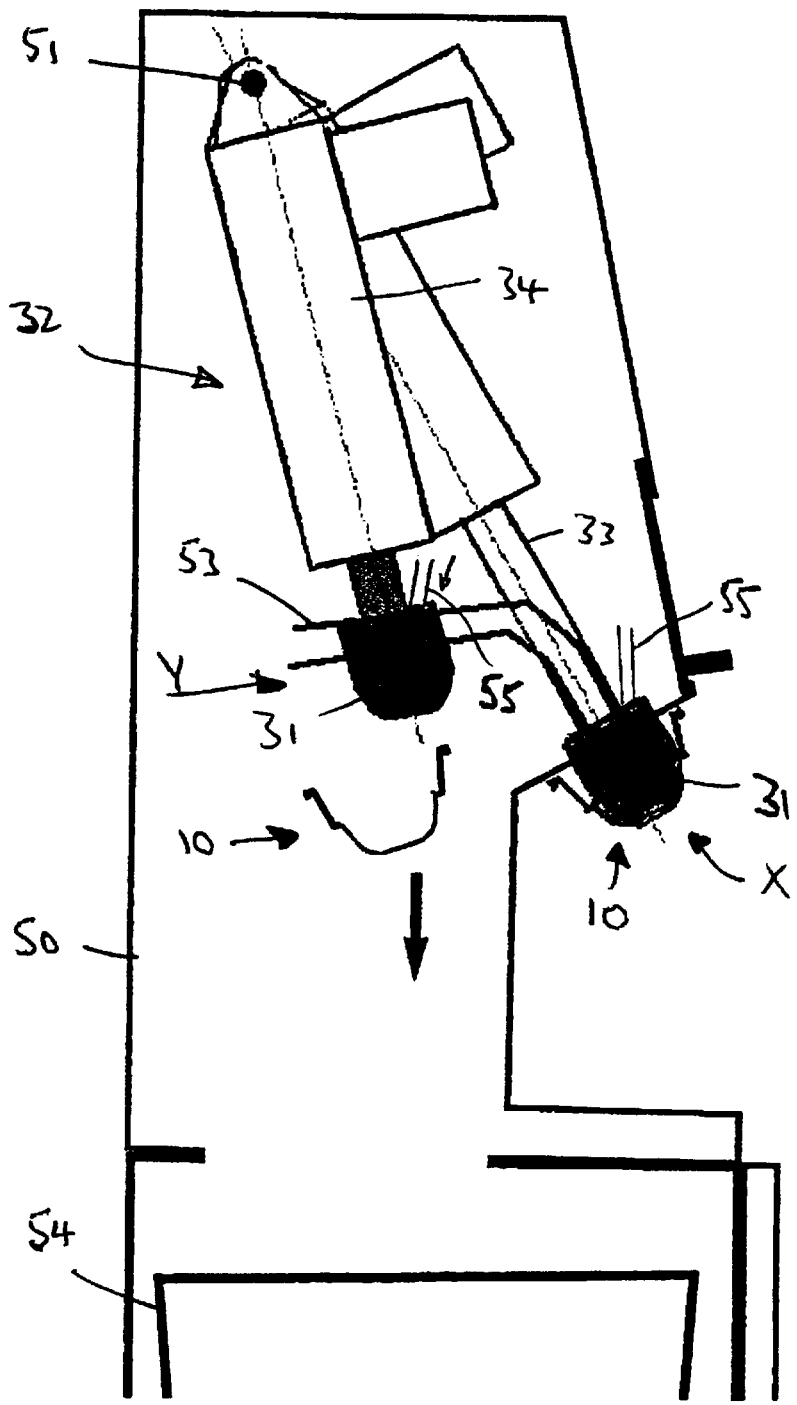

Further features of the invention will appear from the following description of embodiments of the invention given by way of example only and with reference to the drawings, in which:

FIG. 1 shows in cross section a two-part product container,

FIG. 2 shows in vertical section a product container prior to discharge of product, FIG. 3 shows the container of FIG. 2 at an intermediate stage of product discharge, FIG. 4 shows apparatus of the invention during a final stage of product discharge, FIG. 5 shows a view showing completion of product discharge, FIG. 5A shows an alternative product shape, FIG. 6 shows in vertical section apparatus for use in the invention, and FIG. 7 shows a detail of the apparatus of FIG. 6.

Referring to the drawings the illustrated arrangement is a modification or improvement of the apparatus described and shown in WO9413154 and WO01224. The apparatus and method employs a container 10, see in particular FIG. 1, comprising a container base 11 and a container lid or closure member 12. The base 11 has an outlet opening 13 on which may be formed an extension 14, the outlet being sealed with a removable seal 15 prior to discharge of contents of the container 10. The seal may be heat sealed on the outlet 13, adhesively attached to the container 10 prior to removal, or the seal may be moulded into the container.

Instead of the circular outlet opening 13, the opening may be non-circular and it may be formed to open when extrusion pressure is applied by providing weakened lines in the base radially extending from a central point so that the weakened lines rupture and fold downwards and outwards to permit product to pass downwardly therethrough.

The base 11 has a lower portion 17 into which product is loaded and which is of curvilinear form leading to the outlet 13. An upper portion 18 of the base 11 joins the lower portion 17 through a shoulder 19 and at the upper end of the upper portion 18 is formed a lip 20.

The lid 12, like the base 11 is of generally circular cross-section, and the lid has a central portion 22 which is arranged to be deformable. The central portion 22 has an outer part 23 which corresponds in shape to the shape of the lower portion 17 and, during deformation, is arranged to be inverted to lie in contact with the lower portion 17. The central portion 22 has an inner region 24 which is of generally part spherical shape.

At the lower end of the central portion 22 is formed an annular region 25 which, when the lid and base are assembled, is arranged to locate against the shoulder 19. An upwardly directed portion 26 of the lid 12 locates against the upper portion 18 of the base and terminates in a lip 26 which engages over the lip 20 of the base 11, when assembled.

It will be seen that the outlet 13 occupies a considerable cross-section of the lower portion 17 for example 50–100% of the internal cross-sections area of the container but is usually less than the cross-sectional area of the container 10 so that as product is discharged from the container it is extruded through the outlet 13. The outlet 13 is preferable of circular section but it may be of other sections such as rectangular, polygonal elliptical or the like. Similarly the container may be other than circular in cross-section, for example elliptical, rectangular, polygonal, or the like. In this way the external profile of the discharged product may be other than curvilinear or part spherical. For example it may have protrusions defined by the shape of the outlet and the shape of the container, as desired.

After product is loaded into the container 10, the lid 12 and base 11 are brought together to provide a sealed container in which product substantially fills the volume between the lower portion 17 of the base 11 and the central portion 22 of the lid 12. Filling of the container is generally performed in a location where the product is made, conveniently an ice-cream dairy, and the assembled containers are frozen ready for shipment to the point at which the product is to be dispensed. The containers are kept in a frozen condition at the dispensing location at a suitable temperature and the product may be dispensed at a relatively low temperature at which the product is relatively hard. Due to the relatively large outlet opening 13 and the nature of the drive means to be employed in the dispensing operation it may be possible for such relatively hard ice-cream to be dispensed in a manner to be described.

Alternatively the containers and product are tempered to increase the temperature to an ideal dispensing temperature.

Referring now particularly to FIGS. 2–6 the assembled container of FIG. 1 is located in a seating 30 of apparatus for dispensing product from the container 10. The seating is shaped to support the container base 11 and extends close to the outer edge of the outlet 13 whereby the container is adequately supported to avoid damage to the container at high dispensing pressures.

A plunger 31 for engaging the deformable central portion 22 of the container 10 is arranged for reciprocal movement relative to the container and is driven by drive means 32 comprising a drive rod 33 moveable by a linear drive assembly 34 which may be of conventional construction comprising a drive motor operating a worm and worm wheel (not shown) which is capable of delivering a high driving force at a constant rate of movement during discharge of the container, a higher rate of movement being obtained if required during a return movement.

Prior to engagement of the plunger there may be a locking shroud (not shown) around the plunger which locks against the container to hold it in place and keeps the container components together and sealed against leakage.

The plunger 31 is shaped so as to engage the deformable central portion 22 of the container 10 as shown particularly in FIGS. 2 and 3. The central portion 35 of the plunger is shaped to engage the curved inner region 24 and the outer portion 36 of the plunger is arranged to engage the outer part 23 of the deformable portion of the container.

After engaging the container the plunger 31 deforms the outer part 23 thereby causing product in the container 10 to be extruded through the outlet 13. Such discharge will be in the form of an initially cylindrical length of product when the outlet is circular.

A receptacle 40 is located below the container and will usually consist of an edible cone into which the product is to be located but other receptacles such as dishes and cups may be used. The dimensions of the cone are arranged so as to match the dimension of product 46 issuing front the outlet 13. The upper end of the cone 40 is located at a predetermined distance from the container 10 so that the product enters and engages with the cone but as further product is discharged from the container such discharge is resisted by the receptacle so as to cause the product 46 to be shaped by the product laterally extending its dimension, as seen in FIG. 3. The opening into the cone 40 and the outlet opening 13 are dimensioned to correspond.

Discharge of product from the container continues until the central portion 35 of the plunger approaches the outlet 13 at which the remaining product within the container is shaped to have the shape of said central portion. That remaining portion of product is then discharged into the receptacle 40 to present a curved, part spherical appearance to the product 46, FIG. 5. The discharge of the last portion of product from the container may be assisted by providing a reciprocal supplementary plunger 41 which is moveable relative to the main plunger 31 during the final stage of discharge of product, thereby releasing the final portion of product from the container 10 into the receptacle 40.

In addition or alternatively the plunger 31 may be heated sufficient to aid release of the final portion of product from the container by heating the product at its outer surface.

After the product is fully discharged from the container 10 the receptacle 40 is lowered to permit release of the receptacle.

Movement of the plunger may be in two or more stages to permit two or more portions of product to be dispensed in succession.

In FIG. 5A there is shown product 46 in a receptacle, in this case a cone 40, which has been discharged in two stages by movement of the receptacle during discharge, or by altering the rate of movement of the drive means thereby affecting the rate at which product is discharged from the container, or both.

As seen in FIG. 4 the receptacle or cone 40 is supported below the container during discharge on a cone support arm 42 on which is formed support surfaces 43 corresponding in shape to the outer shape of the receptacle 40. The arm 42 is vertically moveable on an upright member 44.

The arm 42 is moveable between positions A, B and C, the position A being the location of the arm 42 during the initial stage of discharging product from the container into the receptacle 40. Due to the location of the receptacle 40 at position A in which the receptacle is close to the outlet 30 there will come a stage when the product has entered and engaged the receptacle and then resists the discharge of product from the container. Due to such resistance a force is applied in the direction of the cylindrical length of product which will become distorted and will increase in its lateral dimension to begin to form a ball shaped quantity of product When such resistance reaches a predetermined level, or when the discharge of product from the container has reached the final discharge stage the receptacle is moved downwards to position B. Such movement may be powered or may be when the force of discharge overcomes a resilient resistance means. Completion of discharge takes place at position B and upon such completion the support arm 14 is moved to position C at which the receptacle 40 can be removed from the arm to be delivered to the customer.

It will be appreciated that the dimension of the outlet 13 will be matched to the size of the upper end of the cone 40. Moreover the receptacle 40 may be held manually below the discharge opening and the operator can offer the resistance to discharge of product to form the lateral extension and create the ball shape of product in the cone. Moreover instead of forming the deformable portion of the lid 12 to have a central domed portion, as shown, the deformable central portion 22 may have a flattened central portion which is an extension of 20 the outer part 23. It may also be possible to provide two or more outlets 13 in the container base so as to provide two or more separate ball portions in a single dispensing operation, for example to match a double or triple cone.

Because the product is extruded directly downwards from the container the product may be packed into the container in several flavours which will result in a multi-flavour product being extruded with good product definition between the flavours. Moreover the container may have a sauce loaded into the container with the ice-cream product and the sauce will be discharged from the container on top of the product in the receptacle. By the use of a heated plunger 31 a liquid topping effect may be provided onto the extruded product. If required the container may include more than one portion of product in which case a cut off valve may be located in or at the level of the seating 30 which assists in shaping the product as each portion is discharged.

As well as discharging product into receptacles such as cones the apparatus may also be used for the dispensing of ice-cream into other receptacles, for example containers of liquid product.

Referring now particularly to FIGS. 6 and 7 there is shown dispensing apparatus in which a linear drive assembly 35 is mounted on a housing 50 through a pivot 51. The plunger 31 has a portion 52 which engages in a cam way 53 whereby as the plunger 31 is moved reciprocally relative to the drive assembly 34 the assembly pivots about the pivot 51 between two positions, a position X which is for discharge of product from the container and a position Y which is for discharge of the container from the plunger 31. At the completion of a discharge operation of product from the container the container 10 is taken by the plunger from the seating 30 from position X towards position Y and the plunger may be a friction fix in the container. On reaching position Y the container 10 is released from the plunger 31 and is discharged into a bin 54 for emptied containers. Discharge may be by engagement of the container with a release surface (not shown) during movement of the plunger.

Location of the empty container on the plunger may be assisted by creating a vacuum below the plunger to secure the container to the plunger and by discharging air through the plunger to release the container in position Y, there being a vacuum pipe and a discharge pipe 55 which enters the plunger for this purpose.

The empty container may alternatively be mechanically picked up and released from its seating.

Instead of having a vertically arranged plunger and container, discharge may be at an angle to the vertical.

Although there is mainly described means for discharging ice-cream into cones, other food products can be discharged such as frozen desserts, and the receptacle may be other than a cone, for example, a cup.

The food product, after discharge, may be dispensed into beverage and/or the beverage may be added after dispensing such as for root beer floats.

Other containers may also be used, for example cylindrical containers with an outlet at one end, along which a piston is moved to affect discharge, by pushing product through the outlet, or deformable containers of other shapes to that described. The receptacle holder may be manually operated, for example using a manual handle for effecting the up and down movement, in some cases with a spring loaded facility for providing resisted movement at a predetermined discharge pressure.

In one arrangement the receptacle for receiving product is located manually in the discharge position and resistance to discharge from the outlet is provided by the operator who therefore causes the product to be shaped by said lateral extension, as described.

It will be appreciated that the invention is best suited to use with relatively hard ice cream such as is normally supplied for the scoop system and which is distinguished from so-called soft serve ice cream which is made in a dispensing machine rather than supplied pre-frozen in containers. Such hard ice cream is usually at relatively low temperatures of about −12° C. to −14° C. during dispensing and is more readily able to expand laterally during compression and extension, as described, to form generally ball-shaped portions.

It has been found that portions may be dispensed which have a diameter of the order of 1½ to 3 times the size of the container outlet opening without the need for excessive compression forces being applied to the product being extruded, for example 100 Newtons pressure. For soft ice cream compressive pressure would not result in lateral expansion. In one arrangement a 10 cm diameter container would have an outlet opening of about 2.5 to 5 cm.

What is claimed is:

1. A food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge, wherein the compression force applied to the product is varied and, during an initial stage of discharge, no resistance to discharge is offered, thereafter compression force is applied.

2. A method according to claim 1 wherein the compression force applied to the product lies along the axis of discharge.

3. A method according to claim 1 wherein after applying a compression force the force is reduced or released then increased again to shape the product accordingly.

4. A method according to claim 1 wherein the rate of discharge of product through the opening is varied whereby to shape the product as it is discharged through the outlet.

5. A method according to claim 1 wherein the receptacle is moved away from the outlet during at least part of the discharge of product through the outlet, the rate of movement depending upon the rate of discharge of product through the outlet.

6. A method according to claim 1 wherein product being discharged from the outlet is of generally circular shape and the application of the compressive force on the product as it is discharged through the outlet causes the product to take on a generally spherical shape at least over its upper surface.

7. A method according claim 1 wherein the outlet is formed as an opening, sealed prior to discharge and openable under the pressure applied by product to be extruded from the container.

8. A method according to claim 1 wherein the portion of the container which is moved towards the outlet defines a curvilinear concave shape, whereby the upper surface of product discharged from the container is of corresponding convex shape after discharge.

9. A method according to claim 1 wherein the receptacle is mounted on a support which is movable relative to the container during discharge, such movement including a stage during discharge to bring about the compression force, and/or a movement for removal of the receptacle after discharge of product.

10. A method according to claim 9 wherein the support is resiliently mounted to permit resisted movement of the receptacle.

11. A food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge, wherein after applying a compression force the force is reduced or released then increased again to shape the product accordingly.

12. A food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge, wherein the receptacle is moved away from the outlet during at least part of the discharge of product through the outlet, the rate of movement depending upon the rate of discharge of product through the outlet.

13. A food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge, wherein the outlet is formed as an opening, sealed prior to discharge and openable under the pressure applied by product to be extruded from the container.

14. A food product dispensing method by which product is dispensed from pre-filled containers of product, the containers having an outlet opening and a portion which is moved towards the outlet to extrude product from the container, whereby the container volume is reduced to extrude product through the outlet and into a receptacle which is located under the outlet, the receptacle being located at a distance below the outlet such that, as or after the product leaves the outlet, the position of the receptacle is arranged so that the receptacle applies a compression force on the product so as to shape the product and cause the cross section of product to be increased laterally of the direction of product discharge, wherein the portion of the container which is moved towards the outlet defines a curvilinear concave shape, whereby the upper surface of product discharged from the container is of corresponding convex shape after discharge.

15. Apparatus for dispensing product comprising a product container having an outlet and a portion which is moved towards the outlet to reduce the container volume, a support for the container, discharge drive means for engaging the moveable portion of the container to move said portion towards the outlet to discharge product by extrusion through the outlet, support means for a receptacle for product discharged, the support means being moveable relative to the container in the direction of discharge and according to the amount of product discharged from the container to bring about a compression force on the product discharged during at least part of said discharge, wherein the support includes support drive means for effecting said movement relative to the container, such drive means being timed to operate according to the operation of the discharge drive means.

16. Apparatus according to claim 15 wherein the discharge drive means includes a linear drive driving a plunger engaging a deformable portion or piston of the container and the linear drive is capable of moving the plunger at a constant or variable rate according to the position of the plunger during discharge.

17. Apparatus according to claim 15 wherein the container has a deformable portion engageable by a plunger, the deformable portion being movable towards the outlet to take up a shape generally similar to the shape of the base of the container in which the outlet is formed.

18. Apparatus according to claim 15 wherein the deformable portion has a central region of generally upwardly concave shape arranged to correspond to the upper profile of product discharged into the receptacle.

19. Apparatus according to claim 15 wherein the plunger is formed with a portion which is moved downwardly relative to the plunger body to assist release of product from the container at the end of a plunger movement.

20. Apparatus according to claim 15 wherein the plunger is heatable to assist in release of product from the container.

21. Apparatus according to claim 15 wherein the container outlet is of non-circular shape whereby to discharge the product having a profile corresponding to the outlet shape.

22. Apparatus according claim 15 wherein the container, after discharge of product therefrom, is lifted with the plunger towards a container discharge position at which the container is released from the plunger.

23. Apparatus for dispensing product comprising a product container having an outlet and a portion which is moved towards the outlet to reduce the container volume, a support for the container, discharge drive means for engaging the moveable portion of the container to move said portion towards the outlet to discharge product by extrusion through the outlet, support means for a receptacle for product discharged, the support means being moveable relative to the container in the direction of discharge and according to the amount of product discharged from the container to bring about a compression force on the product discharged during at least part of said discharge, wherein the plunger is heatable to assist in release of product from the container.

24. Apparatus for dispensing product comprising a product container having an outlet and a portion which is moved towards the outlet to reduce the container volume, a support for the container, discharge drive means for engaging the moveable portion of the container to move said portion towards the outlet to discharge product by extrusion through the outlet, support means for a receptacle for product discharged, the support means being moveable relative to the container in the direction of discharge and according to the amount of product discharged from the container to bring about a compression force on the product discharged during at least part of said discharge, wherein the container, after discharge of product therefrom, is lifted with the plunger towards a container discharge position at which the container is released from the plunger.

* * * * *